C. O. HOPPING.
BICYCLE COASTER BRAKE LOCK.
APPLICATION FILED OCT. 1, 1908.
925,810.
Patented June 22, 1909.
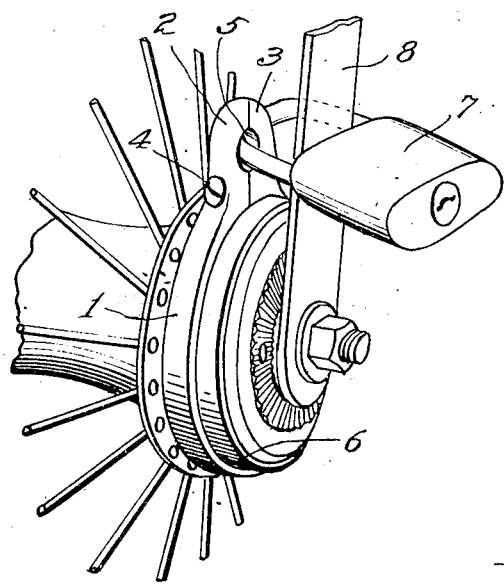
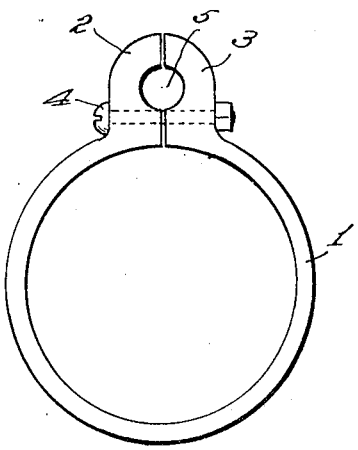
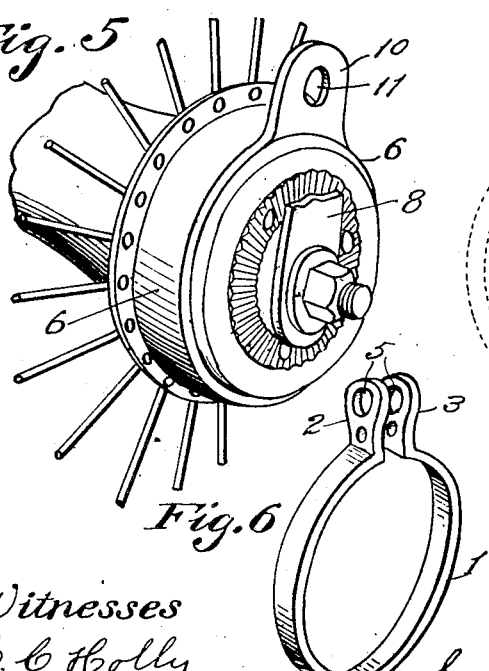
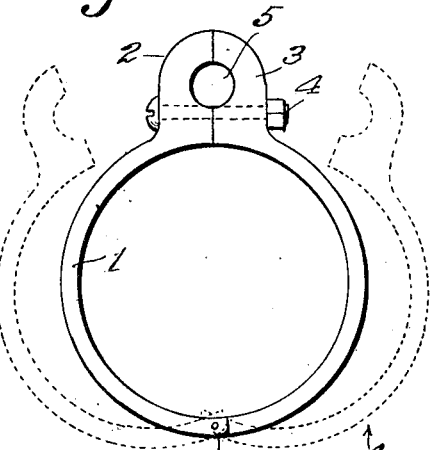
Witnesses
C. C. Holly
S. G. Wells
Inventor
Charles O. Hopping
by James R. Townsend
his atty

UNITED STATES PATENT OFFICE.

CHARLES O. HOPPING, OF LONGBEACH, CALIFORNIA.

BICYCLE COASTER-BRAKE LOCK.

No. 925,810.

Specification of Letters Patent.

Patented June 22, 1909.

Application filed October 1, 1908. Serial No. 455,715.

*To all whom it may concern:*

Be it known that I, CHARLES O. HOPPING, a citizen of the United States, residing at Longbeach, in the county of Los Angeles and State of California, have invented a new and useful Bicycle Coaster-Brake Lock, of which the following is a specification.

An object of this invention is to provide means for locking a coaster brake hub to the frame so that the bicycle cannot be up-ended and trundled off on the coaster brake wheel, and the invention consists of the combination with a coaster brake hub and frame, of a rigid member extending from the hub and adapted to be connected to the fork of the frame by a locking device.

The accompanying drawings illustrate the invention.

Figure 1 is a fragmentary perspective of a coaster brake hub locked to the fork in accordance with the principles of my invention. Fig. 2 is a side elevation of the attachment shown in Fig. 1 removed from the hub. Fig. 3 is a side elevation analogous to Fig. 2 and showing a modified construction. Fig. 4 is an edge view as seen in the direction indicated by the arrow 4 in Fig. 3. Fig. 5 is a fragmentary perspective analogous to Fig. 1, and showing a third modification. Fig. 6 is a perspective of the attachment removed from the hub and showing another form of eye.

In coaster-brake bicycles, locking the pedals or driving-chain does not lock the coaster brake wheel, and if the coaster brake wheel is not locked the bicycle may be trundled off on the coaster brake wheel. In the form shown in Figs. 1 and 2 I provide a split ring 1 having the split clamping portions 2 and 3 adjustably secured together by the bolt 4, and providing the eye 5; said portions 2 and 3 having the eye 5 serving as the rigid member to be locked to the frame. The split ring 1 is applied to the end of the hub 6 and clamped rigidly upon the hub by the bolt 4; the end of said bolt being riveted so that the clamping member will be absolutely rigid and permanent upon the hub. In the form shown in Fig. 6 the members 2 and 3 are transversely perforated to form the eye 5.

Any suitable locking device, as the lock 7, may be used to connect the rigid member to the fork 8 of the frame. In the form shown in Fig. 3 the split ring is formed in two parts connected together by the hinge 9. In the form shown in Fig. 5 the rigid member 10 having the eye 11 is formed integral with the hub 6.

I have shown several ways of applying my invention, and it is obvious that the details of construction may be varied in many other ways without departing from the spirit of my invention.

It is obvious that when the coaster brake hub is locked to the frame that the bicycle must be carried bodily and cannot be trundled upon the coaster brake wheel.

I claim:

1. The combination with a coaster brake hub and frame, of means forming an eye rigid with the hub, and a padlock encircling the frame and engaging the eye.

2. The combination with a coaster brake hub and frame, of an attachment forming an eye rigid with the hub, so that a padlock may embrace the frame and connect with the eye for locking the hub against rotation.

3. In a coaster brake bicycle, the combination with the coaster brake hub, of a split ring having split clamping portions, means to secure said portions together, thereby providing an eye, and means to lock said eye to the bicycle frame.

4. In a coaster brake bicycle, the combination with the coaster brake hub, of a split ring hinged together and having split clamping portions, a bolt to secure said clamping portions together, and a padlock through the eye to connect the same with the bicycle frame.

In testimony whereof, I have hereunto set my hand at Los Angeles, California, this 25th day of September 1908.

CHARLES O. HOPPING.

In presence of—
JAMES R. TOWNSEND,
SEMER G. WELLS.